United States Patent
Masuda et al.

(10) Patent No.: US 8,422,602 B2
(45) Date of Patent: Apr. 16, 2013

(54) PATTERN DETECTION CIRCUIT, BASE STATION AND MOBILE COMMUNICATION SYSTEM USING THE SAME, AND PATTERN DETECTING METHOD

(75) Inventors: Kyoichiro Masuda, Minato-ku (JP); Motoya Iwasaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 1010 days.

(21) Appl. No.: 12/372,470

(22) Filed: Feb. 17, 2009

(65) Prior Publication Data

US 2009/0225908 A1  Sep. 10, 2009

(30) Foreign Application Priority Data

Mar. 5, 2008  (JP) ................ 2008-054237

(51) Int. Cl.
*H04L 27/06* (2006.01)
*H04L 7/00* (2006.01)

(52) U.S. Cl.
USPC .......................... 375/343; 375/368

(58) Field of Classification Search .......... 375/260, 375/342, 343, 368
See application file for complete search history.

(56) References Cited

U.S. PATENT DOCUMENTS

| | | | | |
|---|---|---|---|---|
| 7,133,475 | B2 * | 11/2006 | Kawaguchi et al. | 375/346 |
| 2004/0141570 | A1 * | 7/2004 | Yamazaki et al. | 375/340 |
| 2006/0285599 | A1 * | 12/2006 | Seki et al. | 375/260 |
| 2008/0043858 | A1 * | 2/2008 | Lim et al. | 375/260 |
| 2008/0273744 | A1 * | 11/2008 | Kogure et al. | 382/100 |
| 2010/0054531 | A1 * | 3/2010 | Kogure et al. | 382/100 |
| 2010/0098031 | A1 * | 4/2010 | Charbit | 370/336 |

FOREIGN PATENT DOCUMENTS

| | | |
|---|---|---|
| JP | 2003-134079 A | 5/2003 |
| JP | 2007-259326 A | 10/2007 |
| WO | 2008/156588 A | 12/2008 |

OTHER PUBLICATIONS

Office Action issued Jul. 17, 2012, by the Japanese Intellectual Property Office of Japan in counterpart Japanese Application No. 2008-054237.

* cited by examiner

*Primary Examiner* — Don N Vo
(74) *Attorney, Agent, or Firm* — Sughrue Mion, PLLC

(57) ABSTRACT

A pattern detection circuit for performing pattern detection on input signals from a communication terminal, includes a frequency domain transformer that transforms input signals into frequency domain signals; a frequency extractor that extracts frequency components of the frequency domain signals; and a pattern detector that performs the pattern detection on the input signals based on cross-correlation values in frequency domain between the extracted frequency components and predetermined patterns.

13 Claims, 10 Drawing Sheets

PREAMBLE SIGNAL FORMAT

LTE UPLINK SIGNAL FORMAT (EXCLUDING PREAMBLE)

PATTERN DETECTION CIRCUIT, BASE STATION AND MOBILE COMMUNICATION SYSTEM USING THE SAME, AND PATTERN DETECTING METHOD

INCORPORATION BY REFERENCE

This application is based upon and claims the benefit of priority from Japanese patent application No. 2008-054237 filed on Mar. 5, 2006, the disclosure of which is incorporated herein in its entirety by reference.

TECHNICAL FIELD

The present invention relates to a pattern detection circuit, a base station and a mobile communication system which use the pattern detection circuit, and a pattern detecting method. More particularly, the present invention relates to a pattern detecting method for a preamble signal that a mobile terminal sends to a base station at the beginning of a random access operation in the mobile communication system.

BACKGROUND ART

As a mobile communication system, 3GPP (3rd Generation Partnership Project) LTE (Long Term Evolution) mobile communication system has been known. FIG. 9 shows an example of a general system configuration of the known LTE mobile communication system. Referring to FIG. 9, a mobile terminal 101 is in a cell (not shown) that is the service area of a base station 100.

As shown in FIG. 10, upon calling (at the beginning of random access communication), the mobile terminal 101 sends a PRACH (Physical Random Access Channel) preamble, which notifies a desire to start the random access communication, to the base station 100 by uplink 102 prior to sending a message. The mobile terminal 101 selects one from various kinds of preamble patterns and generates a preamble according to the selected preamble pattern.

The base station 100 receives the preamble, and detects a pattern of signals of the received preamble to obtain a correlation between the received preamble and a predetermined preamble pattern. Then, the base station 100 determines whether the base station 100 should send a message in response to the detected preamble pattern. When the base station 100 approves the message sending, the base station 100 sends an ACK (Acknowledge) to the mobile terminal 101 through a PDSCH (Physical Downlink Shared Channel). When the base station 100 disapproves the message sending, the base station 100 sends nothing. When the base station 100 has searched all kinds of the preamble patterns and has detected nothing that correlates with the received preamble pattern, the base station 100 sends nothing, either.

When the mobile terminal 101 receives the ACK in a certain period after sending the preamble, the mobile terminal 101 sends the message to the base station 100 through the uplink 102. If the mobile terminal 101 detects that no response has been received from the base station 100, the mobile terminal 101 repeats the above-described operation.

FIG. 11 shows an example of a preamble pattern detection circuit at a base station in such a mobile communication system. Referring to FIG. 11, the preamble pattern detection circuit has a frequency converter 1, an FIR (Finite Impulse Response) digital filter 2, a 2048-point FFT (Fast Fourier Transformer) 3, a correlation detector 4, and a peak detector 5.

The frequency converter 1 is for performing frequency shift on signals sent from the mobile terminal by uplink as input signals. The FIR filter 2 is for limiting the bandwidth and lowering the sampling frequency by performing low pass filtering on the frequency converted output. The 2048-point FFT 3 is for transforming a time domain signal into a frequency domain signal by performing 2048-point FFT processing on the bandwidth limited signal.

The correlation detector 4 is for obtaining cross-correlation values between the frequency domain signal and a plurality of predetermined preamble patterns and transforming the results into the time domain signal. For that purpose, the correlation detector 4 has a multiplier 41 for multiplying the frequency domain input signal and each of a plurality of the predetermined preamble patterns; and a 2048-point IFFT (Inverse FFT) 42 for transforming each multiplied output into the time domain signal.

The peak detector 5 is for detecting a peak of cross-correlation values output from the correlation detector 4, and deriving a preamble pattern number corresponding to the detected peak and a peak detected timing as preamble detection output. Japanese Patent Laid-Open No. 2007-259326 discloses an example of that kind of circuit.

Four uplink signals are defined for the uplink signals in the LTE mobile communication system: PUSCH (Physical Uplink Shared Channel), PUCCH (Physical Uplink Control Channel), Sounding RS (Reference Signal), and the above-described PRACH. These signals are assigned to different resource element, respectively. The resource element is an information element uniquely defined by two indices of an index of a narrowband carrier called subcarrier and an index of a time symbol.

The base station is adapted to transform the signal received from the mobile terminal by the uplink into the frequency domain signal by performing FFT processing on the signal and to detect data patterns (the above-described four kinds of signal information) for each subcarrier in the frequency domain.

FIG. 12 shows a signal format of PRACH preamble by one sub-frame. FIG. 13 shows an example of a signal format of an uplink signal excluding the PRACH preamble by one sub-frame. The PRACH preamble is composed of a portion called CP (Cyclic Prefix); a preamble portion including 24576 samples; and a portion called Guard Interval. The uplink signal excluding the preamble signal is composed of #0 to #6 symbols, each of which is composed of the CP and 2048 sample data.

Accordingly, the number of points for the FFT processing performed in the base station is usually 2048 samples. Thus, the preamble pattern detection circuit shown in FIG. 11 also uses 2048-point FFT 3. Since the above-described PRACH preamble that is sent at the random access has a symbol length of 24576 samples, which is longer than that of the other uplink 2048 sample signal, the processing by the 2048-point FFT 3 is repeated by 24576/2048=12 times. That increases the number of points for the FFT processing in the preamble pattern detection circuit, and also increases the throughput.

Reducing the number of points for the FFT can be a solution for reducing the throughput. A method is disposing the FIR filter 2 prior to the FFT 3 at the first stage for the purpose of performing the low pass filtering on the signal to limit the bandwidth and lower the sampling frequency before performing the FFT processing. The method is a down sampling approach in the time domain.

The method, however, requires a steep frequency characteristic for the FIR filter for correctly extracting the subcarrier of the preamble. In order to realize the steep frequency characteristic, the FIR filter needs to have more taps, which disadvantageously results in much more computational complexity in the FIR filter processing.

The above description can be summarized as below: The LTE mobile communication system is adapted to have the frequency bandwidth of the system divided into the narrowband subcarriers and transmit the respective signals. Since the pattern detection processing is performed on the received signal at the base station in the frequency domain, the processing is based on the FFT and IFFT processing with much computational complexity. In addition, as the number of the mobile terminals to be processed increases, the pattern detection processing performed at the base station also increases. That disadvantageously leads a processing delay and slows down the communication speed.

SUMMARY

An exemplary object of the invention is to provide a pattern detection circuit, a base station and a mobile communication system which use the pattern detection circuit, and a pattern detecting method that can reduce the throughput by streamlining the pattern detection on received signals.

A first exemplary aspect of the invention is a pattern detection circuit for performing pattern detection on input signals from a communication terminal, including: a frequency domain transformer for transforming the input signals into frequency domain signals; a frequency extractor for extracting frequency components of the frequency domain signals; and a pattern detector for performing the pattern detection based on cross-correlation values in frequency domain between the extracted frequency components and predetermined patterns.

A second exemplary aspect of the invention is a base station that has the above-described pattern detection circuit. A third exemplary aspect of the invention is a mobile communication system that includes the base station.

A fourth exemplary aspect of the invention is a pattern detecting method for performing pattern detection on input signals from a communication terminal, including: a frequency domain transforming step of transforming the input signals into frequency domain signals; a frequency extracting step of extracting frequency components of the frequency domain signals; and a pattern detecting step of performing the pattern detection based on cross-correlation values in frequency domain between the extracted frequency components and predetermined patterns.

EXEMPLARY EMBODIMENTS

Figure 1:
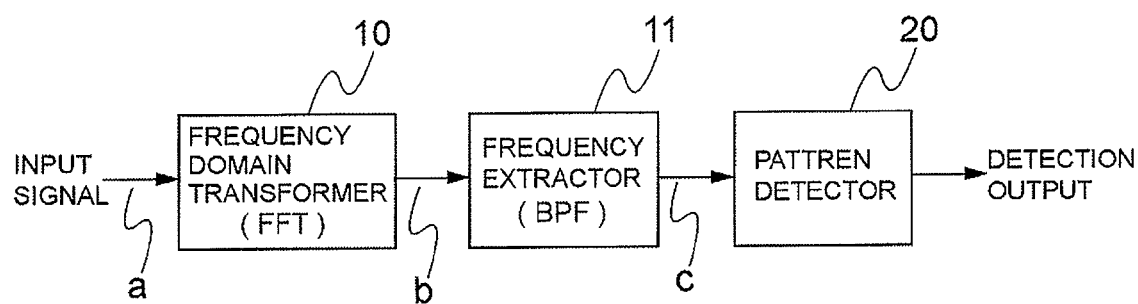
FIG. 1 is a block diagram showing a configuration of a first exemplary embodiment of the present invention.
Figure 2:
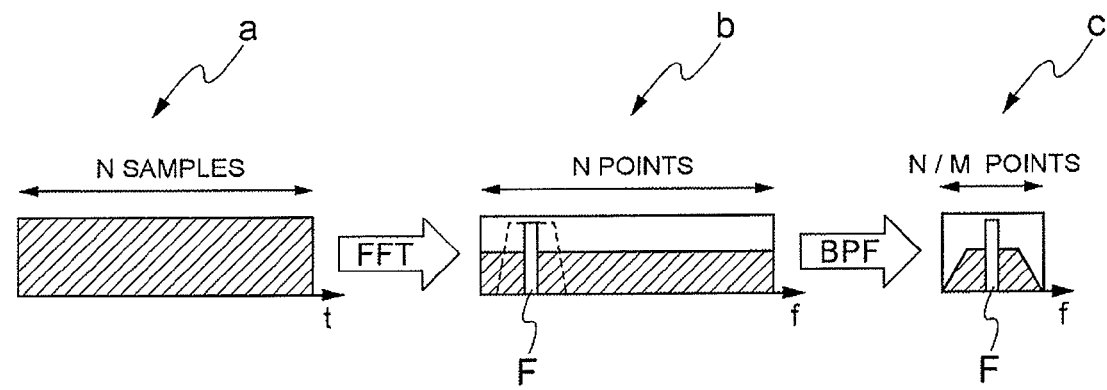
FIG. 2 is a conceptual diagram of down sampling processing in a frequency domain by the configuration shown in FIG. 1.

Exemplary embodiments of the present invention will be described below. FIG. 1 is a schematic functional block diagram showing a first exemplary embodiment of the present invention. FIG. 2 is a conceptual diagram of down sampling processing in a frequency domain by the configuration shown in FIG. 1. In FIG. 2, a to c correspond the signals a to c shown in FIG. 1, respectively.

Referring to FIG. 1, a pattern detection circuit according to the embodiment includes a frequency domain transformer (FFT) 10, a frequency extractor (BPF) 11, and a pattern detector 20.

The frequency domain transformer 10 transforms input signals a received from a communication terminal from the time domain signals into the frequency domain signals b by performing Fast Fourier Transform (see a, b in FIG. 2). Here, it is assumed that the number of samples of the input signals a is N (a power-of-two integer) to which a predetermined frequency F is assigned. That is, the frequency domain transformer 10 is an N-point FFT. The reason why N is a power-of-two integer is that the Fast Fourier Transform FFT processing needs a power-of-two integer for the number of points.

The frequency extractor 11 is a band pass filter (BPF) for selectively extracting a frequency component c of the output b from the frequency domain transformer 10. That extraction processing can reduce the number of points N of the frequency domain signals b. Generally, the number of points before the BPF processing can be reduced to 1/M (M is an integer equal to two or more) (see c in FIG. 2).

Figure 11:
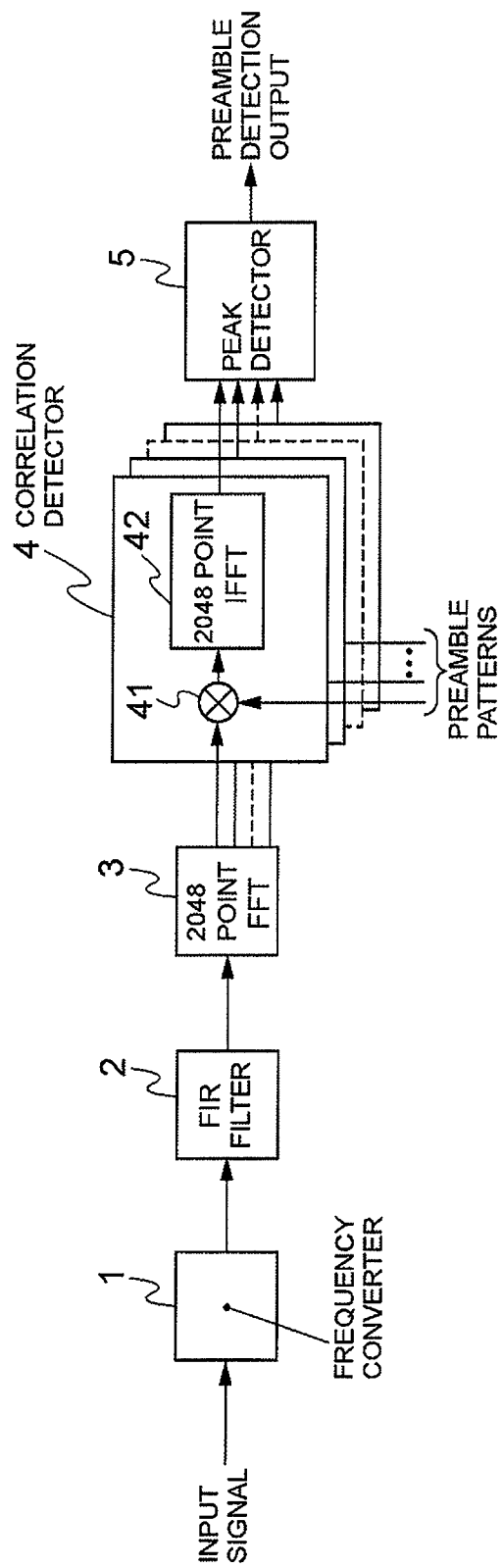
FIG. 11 is a diagram showing an example of a PRACH preamble pattern detection circuit relating to the present invention.

As the down sampling processing in the frequency domain is made possible in that manner, the pattern detector 20 at the next stage can perform the pattern detection in the frequency domain with less number of points. The pattern detector 20 has the same configuration as those of the correlation detector 4 and the peak detector 5 shown in FIG. 11.

As described above, as a result of the BPF processing performed in the frequency domain to reduce the number of the samples to be processed, the throughput required for pattern detection on signals can be reduced.

Figure 3:
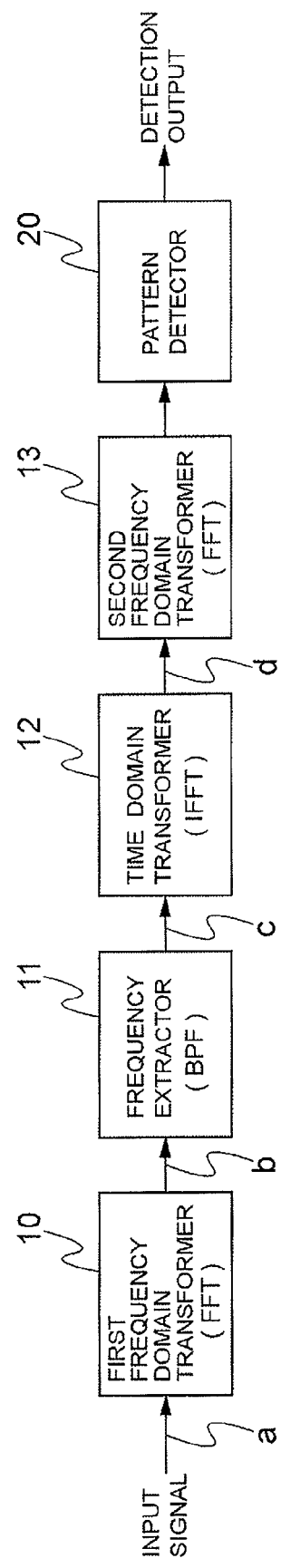
FIG. 3 is a block diagram showing a configuration of a second exemplary embodiment of the present invention.
Figure 4:
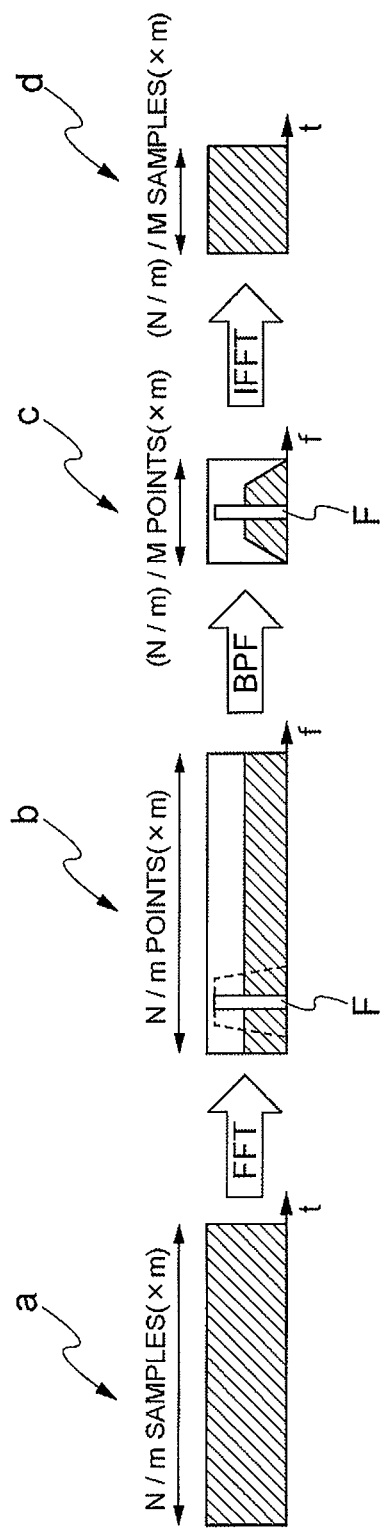
FIG. 4 is a conceptual diagram of FFT processing and IFFT processing by the configuration shown in FIG. 3.

FIG. 3 is a schematic functional block diagram showing a second exemplary embodiment of the present invention. FIG. 4 is a conceptual diagram of down sampling in the frequency domain by the configuration shown in FIG. 3. In FIG. 4, a to d correspond to signals a to d shown in FIG. 3, respectively. In FIG. 3, like parts are denoted by like symbols in FIG. 1.

The embodiment is applied to a case where the number of samples N of the input signals a is large. The embodiment is adapted to divide the input signals a into a plurality of parts, for example m (m is an integer equal to two or more), and performs m times of the FFT processing on respective N/m samples repeatedly. Here, the value of N/m needs to be a power-of-two value for performing the Fast Fourier Transform (FFT) as described above.

Referring to FIG. 3, the embodiment includes a first frequency domain transformer (FFT) 10, a frequency extractor (BPF) 11, a time domain transformer (IFFT) 12, a second frequency domain transformer (FFT) 13, and a pattern detector 20.

The first frequency domain transformer 10 transforms the input signals a received from a communication terminal from the time domain signals into the frequency domain signals b by performing Fast Fourier Transform processing (see a, b in FIG. 4). In this case, the first frequency domain transformer 10 divides N samples of the input signals a into m parts and performs m times of FFT processing are performed serially and repeatedly by using an N/m-point FFT. Then, the FFT output every the N/m points is subjected to the BPF processing and reduced to the number of points (N/m)/M (see c in FIG. 4).

As the m sets of down sampled signals need to be serial in time series, the m sets of down sampled signals are subjected to the IFFT processing in the time domain transformer 12 and transformed into the down sampled time domain signals of N/M samples (see d in FIG. 4). The time domain signals are transformed into the frequency domain signals at the second frequency domain transformer 13, input to the pattern detector 20, and subjected to the pattern detection in the frequency domain.

The second frequency domain transformer 13 may be a DFT (Discrete Fourier Transformer) instead of the FFT. This is because, when the number of the samples of signals to be transformed is not a power-of-two value, the FFT processing is unavailable and the DFT processing need to be performed, unlike the case where the number of the samples of signals to be transformed is a power-of-two value, for which the FFT processing is available. When the second frequency domain transformer 13 is the DFT, the IFFT processing subsequent to the correlation detection in the pattern detector 20 (see IFFT 42 in FIG. 11) is also an IDFT processing. Therefore, if M is selected to make the number of samples N/M a power-of-two, a fast IFFT processing can be performed.

Figure 5:
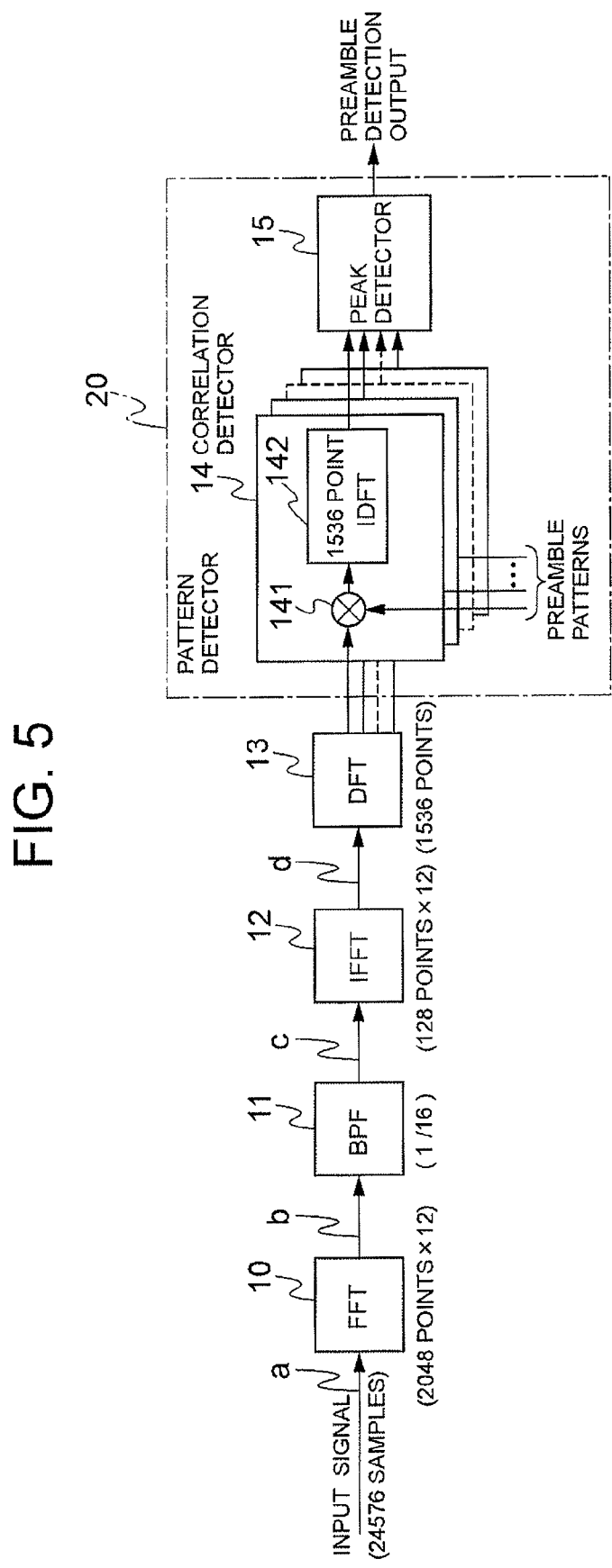
FIG. 5 is a block diagram showing a configuration of a third exemplary embodiment of the present invention.
Figure 6:
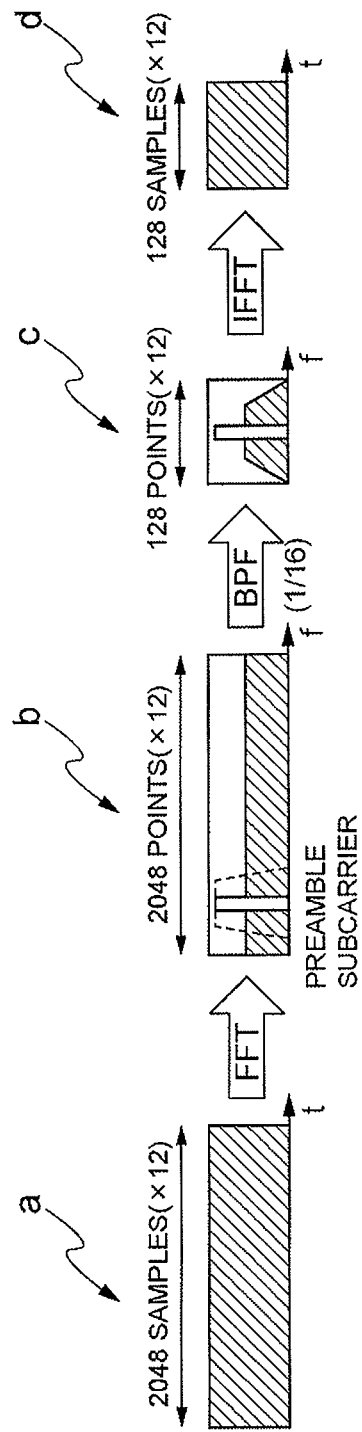
FIG. 6 is a conceptual diagram of FFT processing and IFFT processing by the configuration shown in FIG. 5.

FIG. 5 is a block diagram showing a configuration of a third exemplary embodiment of the present invention. FIG. 6 is a conceptual diagram of down sampling in the frequency domain by the configuration shown in FIG. 5. a to d in FIG. 6 correspond to signals a to d shown in FIG. 5. In FIG. 5, like parts are denoted by like symbols in FIGS. 1 and 3.

Figure 12:
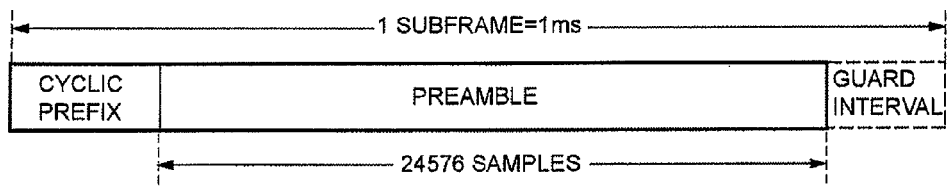
FIG. 12 is a diagram of a PRACH preamble signal format in the LTE mobile communication system.

FIG. 5 is a diagram showing circuitry at the base station in the case where the pattern detection is performed on the PRACH preamble signals shown in FIG. 12. As the preamble signal has a large number of samples such as 24576 samples as shown in FIG. 12, the 24576 samples are generally divided by 12 and 12 times of the FFT processing are performed repeatedly by using the 2048-point FFT at the base station.

Then, the embodiment has the 2048-point FFT 10, the BPF 11, the IFFT 12, the DFT 13, and the pattern detector 20. The FFT 10 divides the 24576 samples of the input signals a by 12 and performs 12 times of the FFT processing on the respective 2048 samples serially and repeatedly (see a, b in FIG. 6). Then, the FFT output for every 2048 points is subjected to the BPF processing. In the BPF processing, down sampling is performed in the frequency domain by reducing the number of points to 1/16 to be 128 points in the frequency domain (see c in FIG. 6).

As 12 sets of down sampled signals need to be serial in time series, the 12 sets of down sampled signals are subjected to IFFT processing in the IFFT 12 and transformed into the down sampled time domain signals of 128 samples X 12 (=1536 samples) (see d in FIG. 6). The time domain signals of 1536 samples are transformed into the frequency domain signals at the 1536-point DFT 13, input to the pattern detector 20, and subjected to the pattern detection in the frequency domain.

In the correlation detector 14 of the pattern detector 20, the frequency domain signals are multiplied with a plurality of preamble patterns in a multiplier 141. The multiplied results are transformed into the time domain signals by the 1536-point IDFT 142 and, in the peak detector 15, the peak and timing of the peak occurrence are detected.

Figure 7:
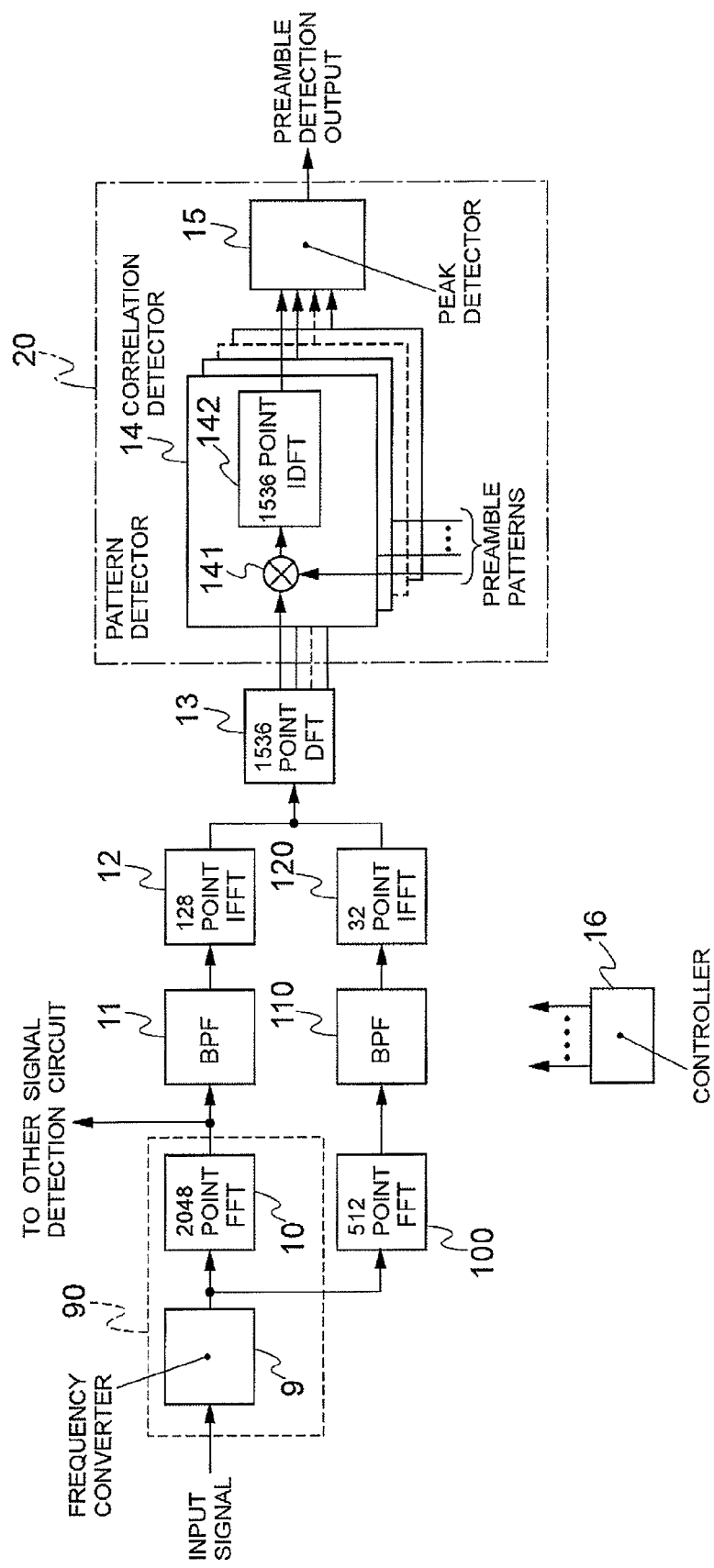
FIG. 7 is a block diagram showing a configuration of a fourth exemplary embodiment of the present invention.

FIG. 7 is a diagram showing a configuration of a fourth exemplary embodiment of the present invention. FIG. 7 is a schematic diagram of the PRACH preamble pattern detection circuit at the base station. In FIG. 7, like parts as those in FIG. 5 are denoted by like symbols in FIG. 5. The embodiment is adapted to scale down the circuit at the base station by using the same FFT as those in the other uplink signal processing circuits such as PUSCH, PUCCH, Sounding RS and the like in the FFT processing in order to detect the PRACH preamble pattern.

The parts in FIG. 7 which differ from those shown in FIG. 5 will be described. The frequency converter 9 is disposed at a stage prior to the FFT 10 shown in FIG. 5. The frequency converter 9 is for performing frequency shift, for example 7.5 KHz frequency shift, on the PRACH preamble and the above-described other signals sent from the mobile terminal by the uplink.

An FFT 100 that performs 512-point FFT processing on the output from the frequency converter 9, a BPF 110 that performs the BPF processing on the FFT output, and an IFFT 120 that performs 32-point IFFT processing on the BPF processing are disposed in parallel to the FFT 10, the BPF 11 and the IFFT 12 shown in FIG. 5. The outputs from both the IFFT 12 and the IFFT 120 are input to the DFT 13. The parts other than those described above are the same as those shown in FIG. 5. A controller 16 is provided in the embodiment for controlling operations of the FFTs 10, 100, the IFFTs 12, 120 and the like.

As described above, since each of the uplink signals excluding the PRACH preamble, such as the PUSCH, the PUCCH, and the Sounding RS has 2048 samples for one symbol data, the frequency converter 9 and the 2048-point FFT 10 can be used in common with a processing circuit (not shown) for the uplink signals excluding the PRACH preamble. Those parts are shown as a common circuit 90 in FIG. 7.

Figure 13:
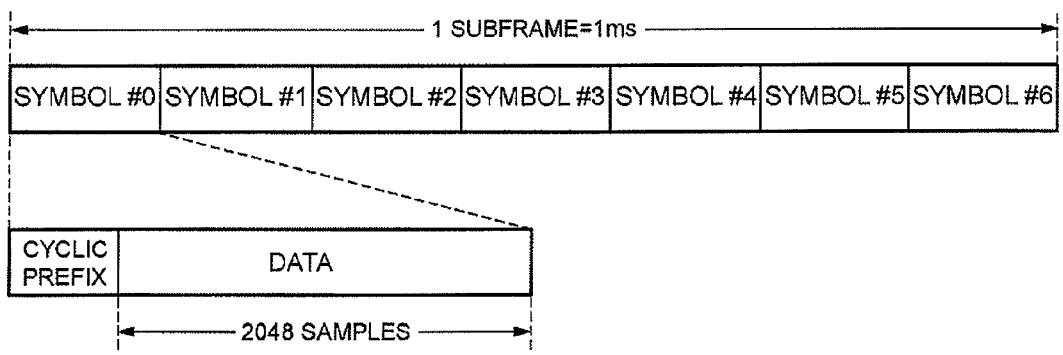
FIG. 13 is a diagram of the other uplink signal excluding the PRACH preamble signal in the LTE mobile communication system.

As the embodiment shown in FIG. 5, the frequency domain signals for the entire preamble are obtained as the result of the 2048-point FFT processing repeated for the preamble length (12 times) in the FFT 10. As shown in FIG. 13, since a usual uplink signal excluding the PRACH preamble has CPs for respective symbols, the 2048-point FFT processing is performed on the usual uplink signal with intervals for the CP portions in the FFT 10 as shown at the second line in FIG. 8. Since the preamble has the serial 24576 samples, the intervals for the CP portions need to be compensated.

For the purpose of the compensation, the preamble detection circuit has a 512-point FFT 100. The preamble detection circuit is adapted to repeat the FFT processing by using the 512-point FFT 100, which is provided in parallel to the 2048-point FFT 10, on the signals that have not been subjected to the 2048-point FFT processing, by 11 times that corresponds to the number of the CPs, as shown at the third line in FIG. 8.

The preamble detection circuit applies the band pass filtering processing by using the BPF 11 to the preamble signals that have been transformed into the frequency domain signals as a result of the FFT processing by the 2048-point FFT 10, and extracts only the frequency components from the subcarrier portion to which the preamble is assigned. As the above-described embodiment, the preamble detection circuit performs the IFFT processing by using the 128-point IFFT 12 on the extraction output and obtains 1/16 down sampled time domain signals.

Also, the preamble detection circuit applies the band pass filtering processing by using the BPF 110 to the preamble signals that have been transformed into the frequency domain signals as a result of the FFT processing by the 512-point FFT 100, and extracts only the frequency components from the subcarrier portion to which the preamble is assigned. Then the preamble detection circuit performs the IFFT processing by using the 32-point IFFT 120 on the extraction output and obtains also 1/16 down sampled time domain signals.

Figure 8:
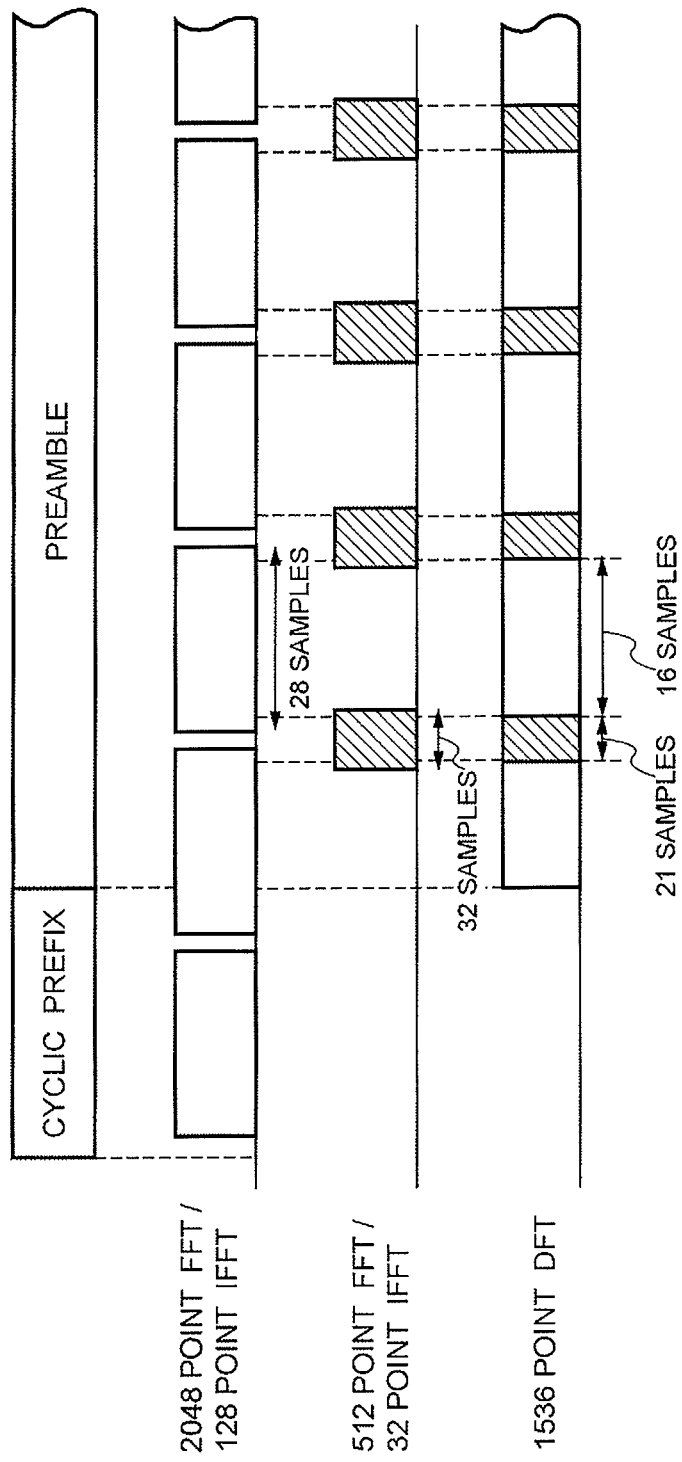
FIG. 8 is a diagram for explaining operations by the configuration shown in FIG. 7.
Figure 9:
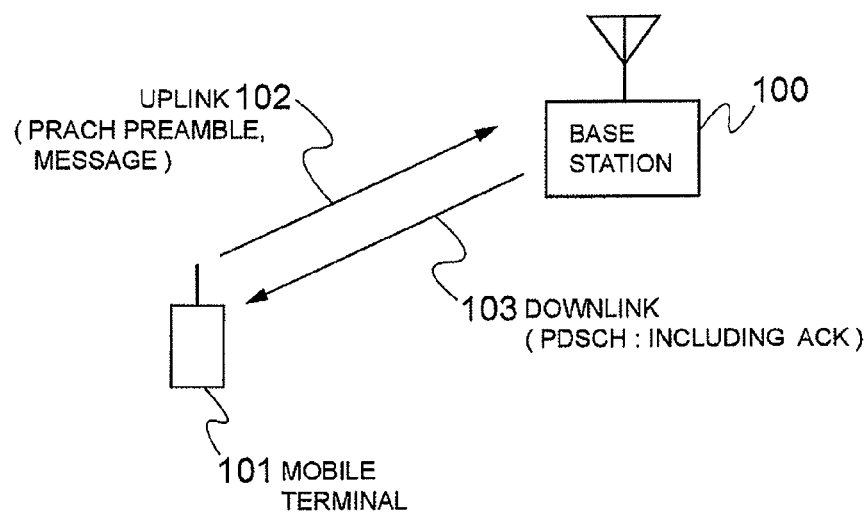
FIG. 9 is a schematic system diagram of an LTE mobile communication system that applies the embodiment of the present invention.
Figure 10:
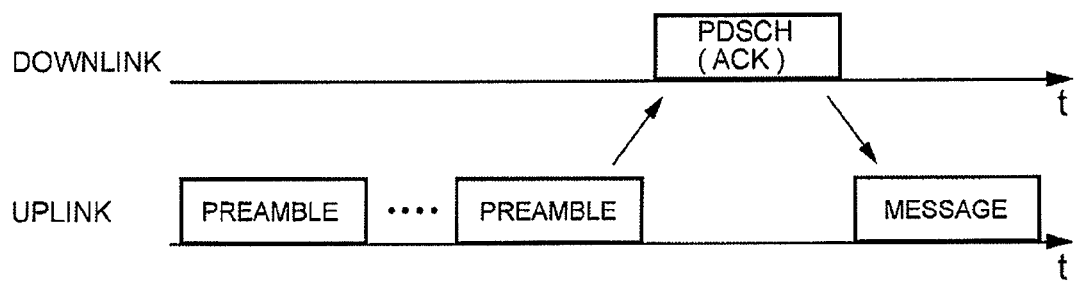
FIG. 10 is a diagram for a relationship between a PRACH and a PDSCH (ACK) at the beginning of random access in the LTE mobile communication system shown in FIG. 9.

Then, the preamble detection circuit adds 116 samples centered in the IFFT processing output from the 128-point IFFT 12 and 21 samples centered in the IFFT processing output from the 32-point IFFT 120, and generates 1536 (=24576/16) samples signal serial in time series as shown at the fourth line in FIG. 8.

The preamble detection circuit uses only the central values of the IFFT results because the IFFT processing results have their both ends degraded in the filtering processing by the BPFs 11 and 110. The preamble detection circuit is adapted to avoid using the information with both ends degraded by using only the central values.

The controller 16 controls operation timing of the above-described FFTs 10, 100, the IFFTs 12, 120 and the like.

The preamble detection circuit performs the DFT processing by using the 1536-point DFT 13 on the signals shown at the fourth line in FIG. 8 and transforms the signals into the frequency domain signals. Then, the preamble detection circuit multiplies the transformed signals with a plurality of preamble patterns in a predetermined frequency domain by using the correlation detector 14. The multiplication is equivalent to obtaining the cross-correlation in the time domain. The preamble detection circuit performs 1536-point IDFT processing on the multiplication results with the predetermined preamble patterns respectively and recognizes which preamble was sent from the mobile terminal at what timing by using the peak detector 15.

Since the FFT 10 at the first stage can be shared for the FFT processing on the other uplink signals, the embodiment has an advantage in downsizing the circuitry in addition to the advantages of the above-described embodiments.

While numerical examples in the above-described embodiments such as the frequencies, the number of points, the number of samples and the like are merely an example, it is apparent that the present invention is not limited to these numerical values and various modifications are possible.

For example, while 1/16 is adopted for the thinning rate in the down sampling, 1/8 may be used. When the thinning rate is 1/8, the numbers of points of the FFT at the first stage can be left as 2048 and 512 in the circuits shown in FIG. 5 and FIG. 7, and change the numbers of points of the IFFT at the later stage to 256 and 64, and the numbers of points of the DFT and IDFT at the subsequent stages to 3072. Generally, 1/M down sampling is available.

Since the circuits shown in FIG. 3, FIG. 5, and FIG. 7 are considered as the PRACH preamble pattern detection circuit, the numbers of processing points of the FFT 10 is 2048, which is one twelfth of the numbers of samples of the preamble 24576; though, the present invention is not limited to those numerical values and any power-of-two numbers that can be subjected to the FFT processing can be used and the input signals can be divided into the number of samples that matches the power-of-two number.

The present invention can be widely used for detecting a pattern of the input signals. The present invention is not limited to the case of the PRACH preamble pattern detection but can be widely used for detecting a pattern of the input signals sent from a communication terminal.

Since the present invention reduces the number of samples to be processed by applying the down sampling in the frequency domain as a result of the BPF (Band Pass Filter) processing in the frequency domain, the present invention is advantageous in reducing the throughput required for detecting a pattern of the received signals such as a preamble in the frequency domain.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A pattern detection circuit for performing pattern detection on first input signals from a communication terminal, comprising:
    a first frequency domain transformer for transforming the first input signals into frequency domain signals;
    a frequency extractor for extracting frequency components of the frequency domain signals; and
    a pattern detector for performing the pattern detection based on cross-correlation values in frequency domain between the extracted frequency components and predetermined patterns,
    wherein between the frequency extractor and the pattern detector, further comprising:
    a first time domain transformer for transforming the extracted frequency components into time domain signals by a number of points that is 1/M (M is an integer equal to two or more) of the number of points to be processed in the first frequency domain transformer; and
    a second frequency domain transformer for transforming the time domain signals into the frequency domain signals; wherein
    the pattern detector performs the pattern detection on the first input signals based on cross-correlation values in frequency domain between output from the second frequency domain transformer and the predetermined patterns,
    the number of points to be processed in the first frequency domain transformer is set to 1/m (m is an integer equal to two or more) of the number of samples in the first input signals, and
    m times of the transforming processing by the first frequency domain transformer are performed repeatedly.

2. The pattern detection circuit according to claim 1, wherein the first frequency domain transformer is shared for frequency transforming on second input signals that uses the same number of points to be processed in the first frequency domain transformer.

3. The pattern detection circuit according to claim 2, wherein
    the second input signals have a predetermined time interval in a predetermined cycle;
    the pattern detection circuit further comprising:
    a third frequency domain transformer having input connected to the input of the first frequency domain transformer and the number of points to be processed that corresponds to the number of samples in the time interval, a second frequency extractor for extracting frequency components of the first input signals by taking output from the third frequency domain transformer as input; and a second time domain transformer for transforming the frequency components extracted by the second frequency extractor into the time domain signals by the number of points that is 1/M (M is an integer equal to two or more) of the number of points to be processed in the third frequency domain transformer; wherein the second frequency domain transformer transforms the output from the first time domain transformer and the output from said second time domain transformer into the frequency domain signals.

4. The pattern detection circuit according to claim 1, wherein the pattern detector comprises:

a calculator for calculating cross-correlation values in the frequency domain between the input of said pattern detector and the predetermined patterns; and a transformer for transforming the cross-correlation values into cross-correlation values in a time domain and, based on a peak value of the transformed cross-correlation values, performing the pattern detection on the input signals.

5. The pattern detection circuit according to claim 1, wherein the first input signals are a preamble from the communication terminal through a random access channel at the beginning of random access.

6. A base station using the pattern detection circuit according to claim 1.

7. A mobile communication system including the base station according to claim 6.

8. A pattern detecting method for performing pattern detection on first input signals from a communication terminal, comprising:

a first frequency domain transforming step of transforming the first input signals into frequency domain signals;

a frequency extracting step of extracting frequency components of the frequency domain signals; and a pattern detecting step of performing the pattern detection based on cross-correlation values in frequency domain between the extracted frequency components and predetermined patterns, wherein, between the frequency detecting step, further comprising:

a first time domain transforming step of transforming the extracted frequency components into time domain signals by a number of points that is 1/M (M is an integer equal to two or more) of the number of points to be processed in the first frequency domain transforming step; and a second frequency domain transforming step of transforming the time domain signals into the frequency domain signals; wherein the pattern detecting step performs the pattern detection on the first input signals based on cross-correlation values in frequency domain between output at the second frequency domain transforming step and the predetermined patterns, the number of points to be processed at the first frequency domain transforming step is set to 1/m (m is an integer equal to two or more) of the number of samples in the first input signals, and m times of the transforming processing at the first frequency domain transforming step are performed repeatedly.

9. The pattern detecting method according to claim 8, wherein the first frequency domain transforming step is shared for a frequency transforming step on second input signals that uses the same number of points to be processed in the first frequency domain transforming step.

10. The pattern detecting method according to claim 9, wherein the second input signals has a predetermined time interval in a predetermined cycle;

the pattern detecting method further comprising:

a third frequency domain transforming step that operates in parallel to the first frequency domain transforming step and has the number of points to be processed that corresponds to the number of samples in the time interval, a second frequency extracting step of extracting frequency components of the first input signals by taking output at the third frequency domain transforming step as input; and a second time domain transforming step of transforming the frequency components extracted by the second frequency extracting step into the time domain signals by the number of points that is 1/M (M is an integer equal to two or more) of the number of points to be processed at the third frequency domain transforming step; wherein the second frequency domain transforming step transforms the output at the first time domain transforming step and the output at the second time domain transforming step into the frequency domain signals.

11. The pattern detecting method according to claim 8, wherein the pattern detecting step comprises:

a step of calculating cross-correlation values in the frequency domain between the output of the second frequency domain transforming step and the predetermined patterns; and a step of transforming the cross-correlation values into cross-correlation values in a time domain and, based on a peak value of the transformed cross-correlation values, performing the pattern detection on the input signals.

12. The pattern detecting method according to claim 8, wherein the first input signals are a preamble from the communication terminal through a random access channel at the beginning of random access.

13. A pattern detection circuit for performing pattern detection on first input signals from a communication terminal, comprising:

first frequency domain transforming means for transforming the first input signals into frequency domain signals;

a frequency extractor for extracting frequency components of the frequency domain signals; and pattern detecting means for performing the pattern detection based on cross-correlation values in frequency domain between the extracted frequency components and predetermined patterns, wherein, between the frequency extractor and the pattern detector, further comprising:

a first time domain transformer for transforming the extracted frequency components into time domain signals by a number of points that is 1/M (M is an integer equal to two or more) of the number of points to be processed in the first frequency domain transformer; and a second frequency domain transformer for transforming the time domain signals into the frequency domain signals; wherein the pattern detector performs the pattern detection on the first input signals based on cross-correlation values in frequency domain between output from the second frequency domain transformer and the predetermined patterns, the number of points to be processed in the first frequency domain transformer is set to 1/m (m is an integer equal to two or more) of the number of samples in the first input signals, and m times of the transforming processing by the first frequency domain transformer are performed repeatedly.

* * * * *

UNITED STATES PATENT AND TRADEMARK OFFICE
CERTIFICATE OF CORRECTION

PATENT NO.        : 8,422,602 B2                    Page 1 of 1
APPLICATION NO.   : 12/372470
DATED             : April 16, 2013
INVENTOR(S)       : Masuda et al.

It is certified that error appears in the above-identified patent and that said Letters Patent is hereby corrected as shown below:

In the Claims

Column 8, Line 35: Claim 1, delete "wherein" and insert -- wherein, --

Column 9, Line 48: Claim 8, after "frequency" insert -- extracting step and the pattern --

Signed and Sealed this
Twenty-first Day of October, 2014

Michelle K. Lee
*Deputy Director of the United States Patent and Trademark Office*